United States Patent
Garg et al.

(10) Patent No.: US 9,465,708 B2
(45) Date of Patent: Oct. 11, 2016

(54) SYSTEM AND METHOD TO PROACTIVELY AND INTELLIGENTLY SCHEDULE DISASTER RECOVERY (DR) DRILL(S)/TEST(S) IN COMPUTING SYSTEM ENVIRONMENT

(71) Applicant: Sanovi Technologies Pvt. Ltd., Bangalore, Karnataka (IN)

(72) Inventors: Devendra Garg, Bangalore (IN); Vinodraj Kuppusamy, Bangalore (IN); Ravi Kumar Raghunathan, Bangalore (IN); Sivakumar Nagarajan, Bangalore (IN)

(73) Assignee: SANOVI TECHNOLOGIES PVT. LTD., Bangalore (IN)

( * ) Notice: Subject to any disclaimer, the term of this patent is extended or adjusted under 35 U.S.C. 154(b) by 163 days.

(21) Appl. No.: 14/145,054

(22) Filed: Dec. 31, 2013

(65) Prior Publication Data
US 2014/0351644 A1    Nov. 27, 2014

(30) Foreign Application Priority Data

May 23, 2013  (IN) .......................... 2253/CHE/2013

(51) Int. Cl.
G06F 11/20    (2006.01)
G06F 11/26    (2006.01)

(52) U.S. Cl.
CPC .................................... *G06F 11/26* (2013.01)

(58) Field of Classification Search
USPC ................................................... 714/41, 4.11
See application file for complete search history.

(56) References Cited

U.S. PATENT DOCUMENTS

| | | | |
|---|---|---|---|
| 7,653,668 B1* | 1/2010 | Shelat et al. | 707/610 |
| 7,925,630 B1* | 4/2011 | Krishnamurthy et al. | 707/649 |
| 2004/0230859 A1* | 11/2004 | Cochran et al. | 714/2 |
| 2007/0168500 A1* | 7/2007 | D'Souza et al. | 709/224 |
| 2007/0174691 A1* | 7/2007 | D'Souza et al. | 714/13 |
| 2008/0256549 A1* | 10/2008 | Liu et al. | 718/106 |
| 2010/0023805 A1 | 1/2010 | Colaiacomo et al. | |
| 2010/0077257 A1* | 3/2010 | Burchfield et al. | 714/37 |
| 2010/0325473 A1* | 12/2010 | Agneeswaran et al. | 714/4 |
| 2011/0060722 A1* | 3/2011 | Li et al. | 707/649 |
| 2012/0047392 A1* | 2/2012 | Akirav et al. | 714/3 |
| 2012/0117422 A1* | 5/2012 | Radhakrishnan | 714/15 |

(Continued)

FOREIGN PATENT DOCUMENTS

CN    102629224 A    8/2012

*Primary Examiner* — Kamini Patel
(74) *Attorney, Agent, or Firm* — Pearne & Gordon LLP

(57) ABSTRACT

A system and method for proactively and intelligently scheduling Disaster Recovery (DR) drill(s)/test(s) for application, a set of applications or entire site in a computing system environment, the system comprising: one or more Drill Intelligence Modules logically connected to one or more Production Sites and one or more Disaster Recovery Sites, one or more Replication Systems logically connected to said Drill Intelligence Module, said Production Site and said Disaster Recovery Site, a Network connecting said Drill Intelligence Module with the Production Site, said Disaster Recovery Site and said Replication system wherein said Drill Intelligence Module is provided with at least one Configuration Monitoring Module, at least one Application Load Monitoring Module, at least one Drill Tracker Module and at least one Drill Advisor Module.

11 Claims, 5 Drawing Sheets

(56) References Cited

U.S. PATENT DOCUMENTS

| | | | |
|---|---|---|---|
| 2012/0260128 A1* | 10/2012 | Benke et al. | 714/15 |
| 2012/0297238 A1* | 11/2012 | Watson et al. | 714/4.11 |
| 2014/0258782 A1* | 9/2014 | Jones et al. | 714/33 |
| 2014/0280961 A1* | 9/2014 | Martinez et al. | 709/226 |
| 2014/0297588 A1* | 10/2014 | Babashetty et al. | 707/613 |
| 2015/0039930 A1* | 2/2015 | Babashetty et al. | 714/4.11 |

* cited by examiner

SYSTEM AND METHOD TO PROACTIVELY AND INTELLIGENTLY SCHEDULE DISASTER RECOVERY (DR) DRILL(S)/TEST(S) IN COMPUTING SYSTEM ENVIRONMENT

CROSS-REFERENCE TO THE RELATED APPLICATION

This application claims priority from Indian Patent Application No. 2253/CHE/2013 dated May 23, 2013, the entire disclosure of which is incorporated herein by reference.

FIELD OF THE INVENTION

The present invention generally relates to computer systems. In particular, the present invention relates to system and method to proactively and intelligently schedule Disaster Recovery (DR) drill(s)/test(s). More particularly, the present invention relates to system and method to proactively and intelligently schedule Disaster Recovery (DR) drill(s)/test(s) for application, a set of applications or entire site in a computing system environment.

BACKGROUND OF THE INVENTION

Disaster Recovery is the process of reinstituting access to data, application, and hardware systems that are critical to resume business operations in the wake of a disaster that has disrupted normal business operations. A Disaster Recovery Plan should include information that not only pertains to the resumption of normal systematic operations post disaster, but should also address any sudden or unexpected disaster by proactively and intelligently scheduling a Disaster Recovery drill or test.

Business enterprises are dependent on computing system environment for maintaining business continuity. Such business enterprises can be broadly termed as IT enterprises, The existence of IT enterprises is dependent on their business continuity and Disaster Recovery Management infrastructure and its effective implementation. IT enterprises generally have large data centres for their production servers at the Production Site. The production servers run application(s) at the Production Site. IT enterprises also maintain Disaster Recovery Site with data centers hosting application(s) that are used in case of disaster at the Production Site.

The configuration of server(s), application(s) and other infrastructure elements at the Production Site are subjected to continuous changes. To have business continuity at the times of disaster or loss of data at the Production Site, IT enterprises keep the disaster recovery data centres updated by replicating the changes occurring at the Production Site to the Disaster Recovery Site. The system and method for replicating the changes made in Production site to the Disaster Recovery Site can be manual, automated or a combination of both.

It has often been seen that the systems and methods used by IT enterprises for replicating the changes made at the Production Site to Disaster Recovery Site fail to replicate certain changes such as, being not limited to, applying patches to the application(s) or changes in configuration of application(s). As a result, the identical replication from the Production Site to the Disaster Recovery Site may not take place.

To overcome such situations, it is a general practice among IT enterprises to test their Disaster Recovery Sites for disaster recovery readiness. The testing of Disaster Recovery Site by IT enterprises to figure out if the Disaster Recovery Site is in sync with the Production Site and if all the relevant changes that have happened on the Production Site have been correctly replicated onto the Disaster Recovery Site is commonly known as Disaster Recovery (DR) drill or Disaster Recovery (DR) test.

DR drill(s)/test(s) are important as system administrators are not sure if all the changes on the Production Site are being fully and correctly replicated on the Disaster Recovery Site. Data centre administrators usually schedule Disaster Recovery (DR) drill(s) or Disaster Recovery (DR) test(s) according to pre-scheduled intervals such as on a quarterly or annual basis for one application or set of applications or entire site, To this end, IT enterprises generally schedule DR drill(s)/test(s) at fixed intervals like quarterly or annually or on an ad hoc or pre-scheduled basis based on some predetermined changes for one application or set of application(s) or entire site.

The schedules for such DR drill(s)/test(s) are generally maintained by keeping records thereof either in the documents or sometimes in the task tracking software.

However, such approaches for scheduling DR drill(s)/test(s) in IT enterprises are not system based that keep track of all the changes that have occurred in the Production Site and changes which have been replicated from the Production Site to the Disaster Recovery Site and also do not use such information to schedule DR drill(s)/test(s).

As a result, the time lag between the changes which have not been replicated from the Production Site to the Disaster Recovery Site and the DR drill(s)/test(s) which reflect that changes have not been replicated from the Production Site to the Disaster Recovery Site increases, which can be detrimental to maintain the business continuity of an IT enterprise in a disaster scenario.

Therefore, the present invention aims at overcoming the aforesaid limitations by taking into account the changes occurring at the Production Site, the changes being replicated from the Production Site to the Disaster Recovery Site, results of previous drills/tests, application/server loads, user policies etc. to proactively schedule DR Drill(s)/Test(s) for one application or set of application(s) or entire site.

The present invention proactively and intelligently provides for the IT enterprises to schedule their Disaster Recovery Drill(s)/test(s) for verifying Disaster Recovery readiness of an application or set of application(s) or for entire site so that the time between the changes that can impact Disaster Recovery and Disaster Recovery (DR) drill(s)/test(s) can be minimized. Thus, the present invention intends to reduce the failure chances during real disaster since the DR drill(s)/test(s) schedule is done in such a way that the time window/slot between a change that can cause failure and the real disaster scenario can be significantly minimized/reduced.

SUMMARY OF THE INVENTION

The present invention provides a system and method to proactively schedule Disaster Recovery (DR) drill(s)/test(s) for application(s) or set of application(s) or entire site based on, not being limited to, changes at the Production Site, changes replicated from the Production Site to the Disaster Recovery Site, previous Disaster Recovery (DR) drill(s)/test(s) results, application/server loads, user policies etc. The term "entire site" refers to all the applications/servers and other IT infrastructure present on data centers at the same physical location or separate geographical locations, A primary object and advantage of the invention is to proactively and intelligently suggest the time at which the IT enterprise should perform DR drill(s)/test(s).

Another object and advantage of the invention is to proactively and intelligently suggest the time at which the IT enterprise should perform DR drill(s)/test(s) so that the time between the changes that can impact the Disaster Recovery and DR drill/test can be minimized/reduced in a real disaster scenario.

Another object and advantage of the present invention is to maintain a track of system load and propose schedules for DR drill(s)/test (s) depending thereon so that the chances of any adverse impact to the business and/or activities of the IT enterprises is minimal or none.

Yet another object and advantage of the present invention is to effectively reduce/minimize the IT system downtime. Typically, when the IT enterprises test their Production Site and Disaster Recovery Site, collectively referred to as Disaster Recovery (DR) Infrastructure, the enterprises may face a hit of IT Systems downtime. The said downtime occurs due to the fact that the Disaster Recovery system may take time to bring back the business continuity of the enterprise in the event of a real disaster scenario or failure at the Production Site. Most businesses relate IT System downtime with the loss of business hours. Hence, knowing the time slot where the business activity is least and scheduling the DR drill/test during that period can help enterprise reduce loss of business hours.

A further object and advantage of the present invention is to substantially reduce/minimize the overall costs of performing DR drills)/test(s). DR drill(s)/test(s) are normally an expensive operation. Loss of business hours equal to the transition time from the Production Site to the Disaster Recovery Site and intervention of the human resources in scheduling the DR drill(s)/test(s) incur costs to the IT enterprises. As the present invention keeps track of the changes, there may be cases where changes which impact the Disaster Recovery do not happen for a long time for application(s) and DR drill(s)/test(s) are not required. In such cases, the present invention advises the user not to conduct the DR drill(s)/test(s). This is difficult for the systems/solutions known in the art to achieve as such systems/solutions do not keep track of changes.

Yet another object and advantage of the invention is to schedule DR drill(s)/test(s) on the basis of changes in the system and not on the basis of fixed intervals like quarterly or annually or on an ad hoc or pre-scheduled basis based on some pre-determined changes for one application or set of application(s) or entire site.

Yet another object and advantage of the invention is to remove the need to maintain schedules for DR drill(s)/test(s) by keeping records thereof either in the documents or in the task tracking software.

A further object and advantage of the present invention is the flexibility of the system in providing the time windows/slots for scheduling the DR drill(s)/test(s).

Accordingly, the exemplary embodiments of the invention include a system for proactively and intelligently scheduling Disaster Recovery (DR) drill(s)/test(s) for application, a set of applications or entire site in a computing system environment, the system comprising: one or more Drill Intelligence Module logically connected to one or more Production Sites and one or more Disaster Recovery Sites, one or more Replication Systems logically connected to the said Drill Intelligence Module, the said Production Site and the said Disaster Recovery Site, a Network connecting the said Drill Intelligence Module with the Production Site, the said Disaster Recovery Site and the said Replication system wherein the said Drill Intelligence Module is provided with at least one Configuration Monitoring Module, at least one Application Load Monitoring Module, at least one Drill Tracker Module and at least one Drill Advisor Module, The key components of the DR Drill Intelligence Module in the system for proactively scheduling Disaster Recovery drill(s)/test(s) comprises:

Configuration Monitoring Module which may be used to receive configuration information and values from the elements of the Production Site and the Disaster Recovery Site such as servers, databases, applications etc;

Application Load Monitoring Module which may be used to receive application loads and server loads information from the Production Site and the Disaster Recovery Site;

Drill Tracker Module which may be used to maintain the list of applications, user policies sets, history of the DR drills/tests performed on applications, set of applications or entire site, schedule for upcoming DR drills/tests etc,: and Drill Advisor Module which may interact and receive information from the said Configuration Monitoring Module, Application Load Monitoring module and the Drill tracker Module to run a set of heuristics for estimating the next schedule for DR Drill(s)/test(s) for applications, set of applications or entire site The exemplary embodiments of the invention further includes a method to proactively schedule DR drill(s)/test(s) for application(s) or set of application(s) or entire site, the method comprising the steps of: prompting the Drill Advisor Module to fetch list of application(s), the list of next DR drill(s)/test(s) schedule(s) for the said application(s) and the user policies for DR Drill(s)/test(s) for said application(s) from Drill Tracker Module. The Drill Advisor Module is also prompted to read the user policies for DR Drill(s)/test(s) for said application(s).Thereafter, the Drill Advisor Module is prompted to check whether the said DR drill(s)/test(s) schedule(s) satisfies the said user policy set or not. If the DR Drill(s)/test(s) schedule(s) satisfies the user policy set, the Drill Advisor Module is further prompted to accumulate all the changes in the applications and process changes since the previous drill from the Configuration Monitoring Module.

Thereafter, the Drill Advisor Module is further prompted to assign severity of "CRITICAL" and "WARNING" to the said accumulated changes. Severity of "CRITICAL" and WARNING" is pre-defined for each change in the system. If the changes in application(s) or process change(s) have severity "CRITICAL", the Drill Advisor Module is prompted to re-schedule the DR drill/test. The re-scheduling of the DR drill/test is carried out by the Drill Advisor Module by finding the next available slot for the DR drill/test and updating the Drill Tracker Module with the new schedule. However, if the changes in the application or process changes do not have the severity "CRITICAL", the Drill Advisor Module is prompted to sum up the weight/value of each change and compare the changes with a pre-determined value in the Drill Advisor Module, If the value of the summed weight/value of each change exceeds the said pre-determined value, the Drill Advisor Module is prompted to re-schedule the DR drill/test by finding the available slot for the DR drill/test and updating the Drill Tracker Module with the new allotted schedule. However, if the value of the summed weight of each change does not exceed the said pre-determined value, the Drill Advisor Module is not prompted to re-schedule the DR drill/test.

The Drill Advisor Module is prompted to check further if the user policy set defines a drill window/slot for re-scheduling the DR drill/test. If the user policy set defines a window/slot for re-scheduling the DR drill test, the Drill Advisor Module picks the next available window /slot based on the user policy set. However, if the user policy set does not define a window/slot for re-scheduling the DR drill/test, the Drill Advisor Module is prompted to check the load on servers involved in the system and to find a next slot with the least server load. The server load information is fetched by the Drill Advisor Module from the Application Load Monitoring Module.

Thereafter, the Drill Advisor Module may also be prompted to check if the number of DR drills/tests configured for a particular day exceeds the daily limit of the number of DR drills/tests to be conducted. If the number of DR drill(s)/test(s) configured for a particular day exceeds the daily limit of the number of drill(s)/test(s) to be conducted, the Drill Advisor Module is prompted to re-schedule the DR drill(s)/test(s) on the next available window/slot where the number of DR drill(s)/test(s) configured for a particular day does not exceed the daily limit of the number of drills to be conducted. However, if the number of DR drills/tests configured for a particular day does not exceed the daily limit of the number of drill(s) to be conducted, the DR drill(s)/test(s) is conducted as per schedule and the Drill Tracker Module is updated with the new allotted schedule.

DETAILED DESCRIPTION OF THE INVENTION

The exemplary embodiments of the invention provides a system and method to proactively and intelligently schedule Disaster Recovery (DR) drill(s)/test(s) for application or set of application(s) or entire site based on the changes in the Production Site, changes replicated from the Production Site to the Disaster Recovery Site, previous Disaster Recovery drill(s)/test(s) results, application/server loads, user policies, severity levels of the changes or the like that can impact the disaster recovery.

Figure 1:
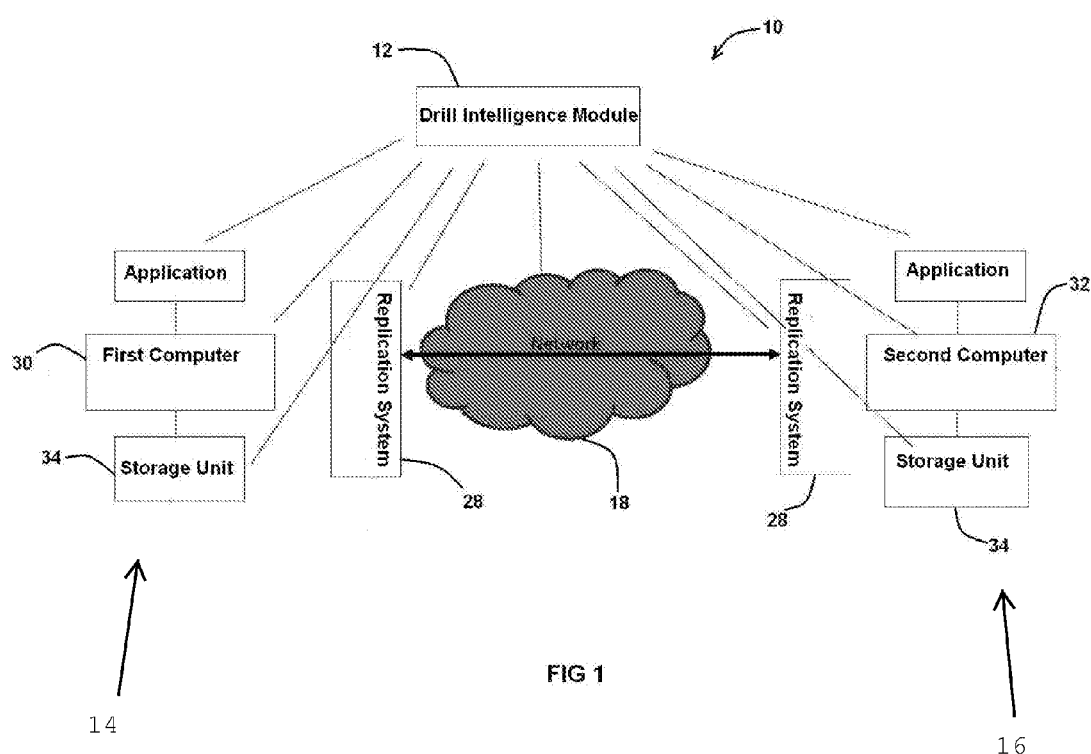
FIG. 1 is a diagram illustrating an exemplary environment in which the system for proactively and intelligently scheduling Disaster Recovery drill(s)/test(s) for application or set of application(s) or entire site according to the present invention operate.

FIG. 1 is a diagram illustrating an exemplary environment in which the system 10 for proactively and intelligently scheduling Disaster Recovery drill(s)/test(s) for application(s) or set of application(s) or entire site operate.

According to the exemplary embodiment, a system 10 comprising a Drill Intelligence Module 12 for proactively and intelligently scheduling the DR drill(s)/test(s) is provided. One or more Drill Intelligence Module 12 may be provided in the system 10 for proactively and intelligently scheduling the DR drill(s)/test(s).

The system 10 further comprises one or more Production Site 14, one or more Disaster Recovery Site 16 and one or more Replication Systems 28. The Production Site 14 is provided with one or more data centers where production servers and applications run. The Disaster Recovery Site 16 is also provided with one or more data centers with DR servers and applications. The Replication System 28 replicates the changes from the Production site 14 to the Disaster Recovery site 16.

The system 10 further comprises a Network 18 connecting the Production Site 14 the Disaster Recovery Site 16 and a Replication System 28. The Replication System 28 is logically coupled to the Production Site 14, the Disaster Recovery Site 16 and the Network 18. The logical connection may be an IP network connection or connection already known in the art.

One or more applications of the IT enterprise that are required to be available continuously run on one or more first computers 30 at the Production Site 14. Data Protection scheme are also configured to protect the applications running on one or more first computers 30 at the Production Site 14.

The applications and data protections schemes available at the Production site 14 may also run on one or more second computers 32 at the Disaster Recovery Site 16. One or more storage units 34 may be connected to the first computers 30 and the second computers 32 at the Production Site 14 and the Disaster Recovery Site 16. Operating systems running on the first computers 30 and the second computer 32 support operations of an IT enterprise's business continuity or Disaster Recovery solutions.

A plurality of agents of the Replication System 28 and the DR Drill Intelligence Module 12 may be deployed on the said first computers 30, the said second computers 32, Network 18 and other elements of the Production Site 14 and the Disaster Recovery Site 16.

The elements of the Production Site 14 and the Disaster Recovery Site 16 may, not being limited to, include elements such as servers, databases, application(s), network switches, storage devices etc. The said agents of the Replication System 28 continuously monitor the changes at the Production Site 14 and the Disaster Recovery Site 16 and provide a real time status to the Replication System 28 and the DR Drill Intelligence Module 12 of the system 10.

Applications in the Production Site 14 and their copies in Disaster Recovery Site 16 may include, not being limited to, databases, file systems, web servers, infrastructure, applications like DNS, active directory and other custom software used by the enterprise customers etc.

According to the exemplary embodiments of the invention, the user requests may be served by the application(s) running on the Production Site 14 when there is no disaster or failure at the Production Site 14. However, when there is no disaster or failure at the Production Site 14, the application(s) and server(s) on the Disaster Recovery Site 16 may not serve any requests in the system 10 i.e. the applications and servers of the Disaster Recovery Site 16 may be down or in a non active mode. Even in such non-active mode, the applications and servers of the Disaster Recovery Site 16 are able to receive the changes occurring to the data and configuration settings of the applications at the Production Site 14.

In the event of disaster or failure at the Production Site 14, the applications and servers on Disaster Recovery Site 16 become available for the servers and applications in the Production Site 14.

Figure 2:
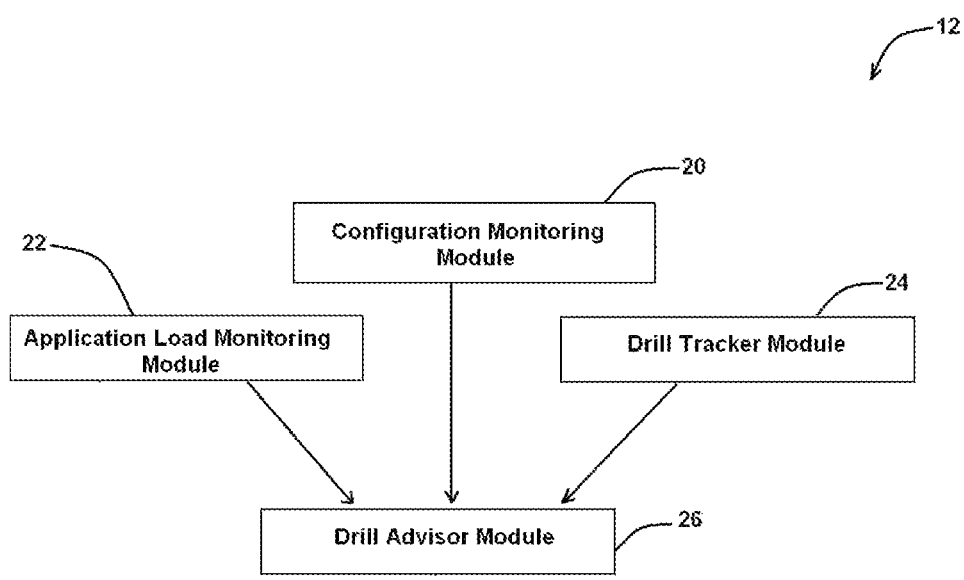
FIG. 2 is diagram illustrating the components of the DR Drill Intelligence Module according to the present invention.

FIG. 2 illustrates the components of the Drill Intelligence Module 12 comprising a Configuration Monitoring Module 20, an Application Load Monitoring Module 22, a Drill Tracker Module 24 and a Drill Advisor Module 26.

The Configuration Monitoring Module 20 may, not being limited to, receive the configuration values like application version(s), server hardware configuration(s), storage device configuration information etc. from the elements of the Production Site 14 and the Disaster Recovery Site 16. The configuration values received by the Configuration Monitoring Module 20 are called configuration parameters.

The configuration parameters may be received from both Production Site 14 and Disaster Recovery Site 16. To get configuration information from elements of the Production Site 14 and the Disaster Recovery Site 16 such as servers, applications, databases, network devices and the likes, the Configuration Monitoring Module 20 is required to communicate with the said elements. The said communication with the elements of the Production Site 14 and the Disaster Recovery Site 16 may either be by polling or by receiving events.

In Communication by polling, the Configuration Monitoring Module 20 uses communication method exposed by the elements of the Production Site 14 and the Disaster Recovery Site 16. Some of the said communication methods are standard protocols like SSH (Secure shell), WMI (Windows management Interface), JDBC and SNMP or the like. It may also be propriety protocols exposed by the said elements that run on standard TCP/IP or UDP or the like. The Configuration Monitoring Module 20 periodically gets the required information from the elements of the Production Site 14 and the Disaster Recovery Site 16 by using the said communication methods.

In communication by receiving events, the configuration information is received when the elements of the Production Site 14 and the Disaster Recovery Site 16 provide mechanism where Configuration Monitoring Module 20 registers itself to receive changes as it happens in the elements of the Production Site 14 and the Disaster Recovery Site 16 such as SNMP Traps.

The Configuration Monitoring Module 20 may detect the changes in the configuration parameters and may feed such changes to a DR Drill Advisor Module 26. The configuration information is received by Configuration Monitoring Module 20.

Some of the examples of configuration parameters monitored by the Configuration Monitoring Module 20, not being limited to, are:
 a. Server OS Version or sub-versions,
 b. Server hardware configurations like RAM/processor information/interface cards information. The information collected may, not being limited to, be version/capacity/etc. of the server hardware.
 c. Storage configuration. The information collected may, not being limited to, be firmware version of storage devices.
 d. Replication software version and type.
 e. Application/Databases, not being limited to:
  i. Version Number of the application(s) and database
  ii. Application configurations such as username/passwords
  iii. Application configurations such as amount of Memory allocated
  iv. Application paths
 f. Application dependency information
  i. If application is dependent on other application(s), the connectivity information thereof for the target application(s).

The Application Load Monitoring Module 22 may periodically receive information in relation to, not being limited to, application loads and server load information. Application Load Monitoring Module 22 may receive the above mentioned information either by polling or receiving events from, not being limited to, applications and servers. The information received by the Application Load Monitoring Module 22 may be used to compute a suitable time for DR drill(s)/test(s) so that the time lag between the changes replicated from the Production Site 14 to the Disaster Recovery Site 16 and the DR drill (s)/test(s) reflecting such changes can be minimized/reduced.

The Application Load Monitoring module 22 may maintain the information, not being limited to:
 a) Track of time window/slots where application usage is minimum. The time when the application usage is minimum is the time when DR drill(s)/test(s) can be scheduled/re-scheduled. In one of the embodiments, the IT enterprises schedule the drill(s)/test(s) during non-peak times or off-peak times such as weekends or early morning.
 b) The details such as time windows/slots when the DR drill(s)/test(s) are scheduled/re-scheduled may also be directly added by the user input where user can feed load information manually.
 c) Users may also configure the system 10 to not consider application load monitoring information for DR drill(s)/test(s) schedule.

The Drill Tracker Module 24 may, not being limited to, maintain the history of DR drill(s)/tests being performed on an application or set of application(s) or for entire site. The Drill Tracker Module 24 may also, not being limited to, maintain the schedule for upcoming drills. Information maintained in Drill Tracker Module 24 may include the day and/or the time a drill was performed and detailed status of such DR drill(s)/test(s). The detailed status may include information such as, not being limited to, if the DR drill was successful or not successful. Users may update the Drill Tracker Module 24 whenever the DR drill/test is performed.

The Drill Tracker Module 24 may maintain the information such as, not being limited to:
 a. Track of DR drill(s)/test(s) schedule for one or more application(s).
 b. Track of past drill(s)/test(s) and status of such DR drills/tests such as, not being limited to,
  i. Information whether the DR drill(s)/test(s) were successful or un-successful.
  ii. Issues faced in previous DR drill(s)/test(s). Most of the times, issues faced during a step in the DR drill(s) are corrected at the same time and the system 10 moves on to further steps. Step failure information is recorded in Drill Tracker Module 24 and this information may also be used for Drill Schedule. In case, there are many steps when the drill/test failed and then corrected for an application DR Drill, the next schedule for this application may receive more priority.

c. Track number of application(s) drill(s)/test(s) scheduled in a drill time window/slot.

The Drill Advisor Module 26 may, being not limited to, receive changes and information from Configuration Monitoring Module 20, Drill Tracker Module 24 and Application Load Monitoring Module 22 to run a set of heuristic for estimating the next schedule for DR drill/test for an application, a set of application or entire site.

Figure 3:
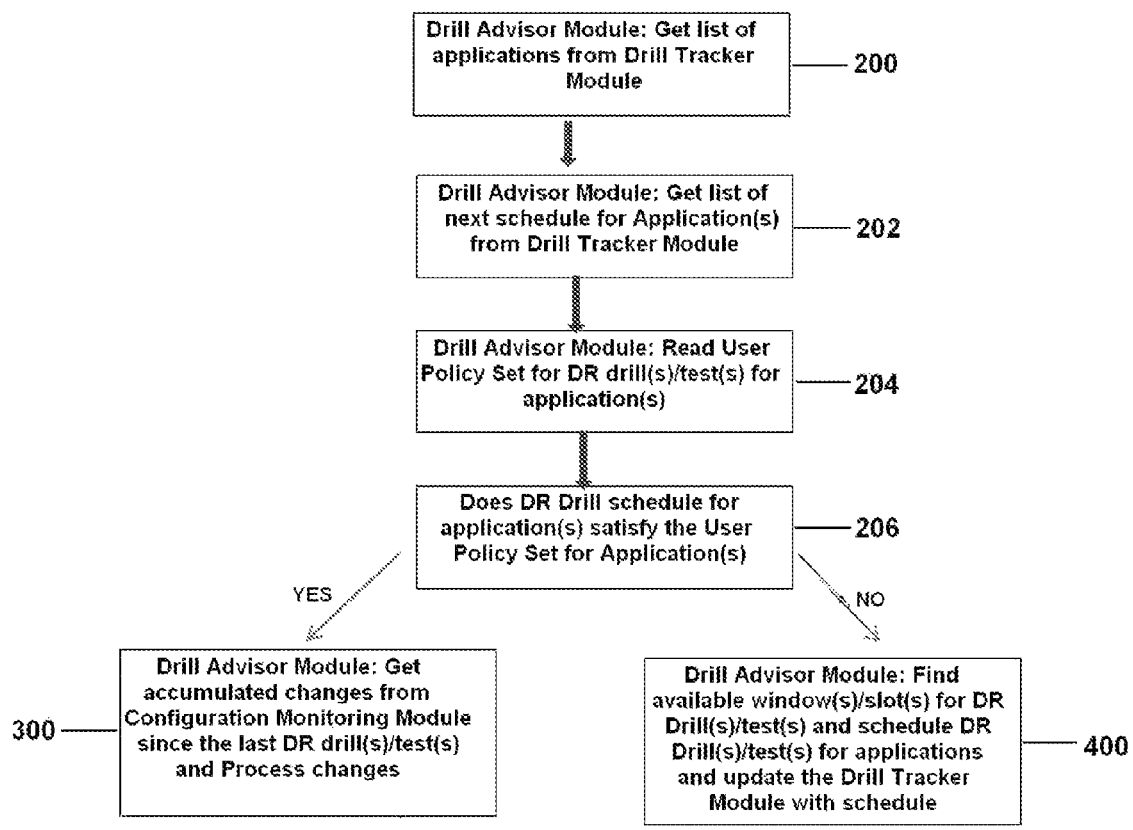
FIG. 3 is a Flow Chart illustrating the steps involved in proactively scheduling Disaster Recovery (DR) drills/test(s) according to the present invention.

FIG. 3 is a flow chart illustrating the steps involved in proactively and intelligently scheduling disaster recovery (DR) drills/test(s) for the system 10. As the computing environment operates, the Drill Advisor Module 26 at step 200 is prompted to fetch the list of applications from the Drill Tracker Module 24.

Thereafter, at step 202, the Drill Advisor Module 26 is further prompted to fetch a list of the next DR drill(s)/test(s) schedules for the said application(s) from the Drill Tracker Module 24.

At step 204, the Drill Advisor Module 26 is prompted to fetch the user policy set from the Drill Tracker Module 24 and read the said user policy set to determine the schedule of the Drill(s)/test(s) for the said application(s). User policies are user preferences for the DR drill(s)/test(s) schedule. In one embodiment, the user may set time window for DR drill(s)/test(s) as per preference when the business activity of an IT enterprise is the least such as during weekends, early morning or the like. In another embodiment, the user may define a fixed schedule which overrides the suitable schedule suggested by Drill Advisor Module 26 such as on a National holiday where the user would know for sure that business activity of an IT enterprise is the least.

At step 206, the Drill Advisor Module 26 is prompted to check if the next DR drill(s)/test(s) schedule(s) for the said application(s) obtained at step 202 satisfies the said user policy set for DR Drill(s)/test(s) obtained at step 204. If the DR drill(s)/test(s) schedule(s) for application(s) satisfies the user policy set for said application(s), the system 10 goes to step 300. If the DR drill(s)/test(s) schedule(s) for application(s) does not satisfy the user policy set for application(s) the system 10 goes to step 400.

Reference will now be made to FIG. 3 further describing the step 300. As illustrated, if the DR drill(s)/test(s) schedule(s) for the said application(s) satisfies the user policy set for application(s) checked at step 206, the Drill Advisor Module 26 is prompted to accumulate the changes since the last/previous DR drill/test which is fetched from the Configuration Monitoring Module 20.

At step 302, the Drill Advisor Module 26 is prompted to assign seventy of "CRITICAL" and "WARNING" to all the changes accumulated at step 300. The changes may comprise, not being limited to, changes in the said applications, data, process changes, configuration parameter changes or the like. Severity, such as "CRITICAL" and "WARNING" are pre-defined and determined on the basis of weight/value of each change in the system 10.

At step 304, the Drill Advisor Module 26 is prompted to check, if the changes have severity level as "CRITICAL". If the said changes are found to be critical, the Drill Advisor Module 26 is prompted to go to step 306. At step 306, the Drill Advisor Module 26 re-schedules the DR drill/test and is prompted to go to step 312. At step 312, the DR drill/test is rescheduled by finding an available slot for the DR drill/test and the Drill Tracker Module 24 is updated with the new allotted schedule.

If the said changes are found to be not critical, the Drill Advisor Module 26 goes to step 308. At step 308, the Drill Advisor Module 26 is prompted to sum up the weight/value of each change. At step 310, the Drill Advisor Module 26 is prompted to check if the summed weight/value of each change exceeds a pre-determined value stored in the Drill Advisor Module 26.

The said pre-determined value may be a default value assigned by the user which can be changed based on the criticality of application. In general, smaller value may schedule more DR Drill(s)/test(s) and larger value may schedule less DR drill(s)/test(s). The said default assigned value may be given based on the industry best practices for DR drill(s)/test(s) and on the past experiences.

At step 310, if the value of summed up change at step 308 exceeds the said pre-determined value, the DR Drill Advisor Module 26 is prompted to go to step 306. At step 306, the Drill Advisor Module 26 re-schedules the DR drill/test and is prompted to go to step 312. At step 312, the DR drill/test is rescheduled by finding an available slot for the DR drill/test and the Drill Tracker Module 24 is updated with the new allotted schedule. However, if the value of the summed up change at step 308 does not exceed the said pre-determined value, the DR drill/test schedule is not re-scheduled by the Drill Advisor Module 26.

Figure 4:
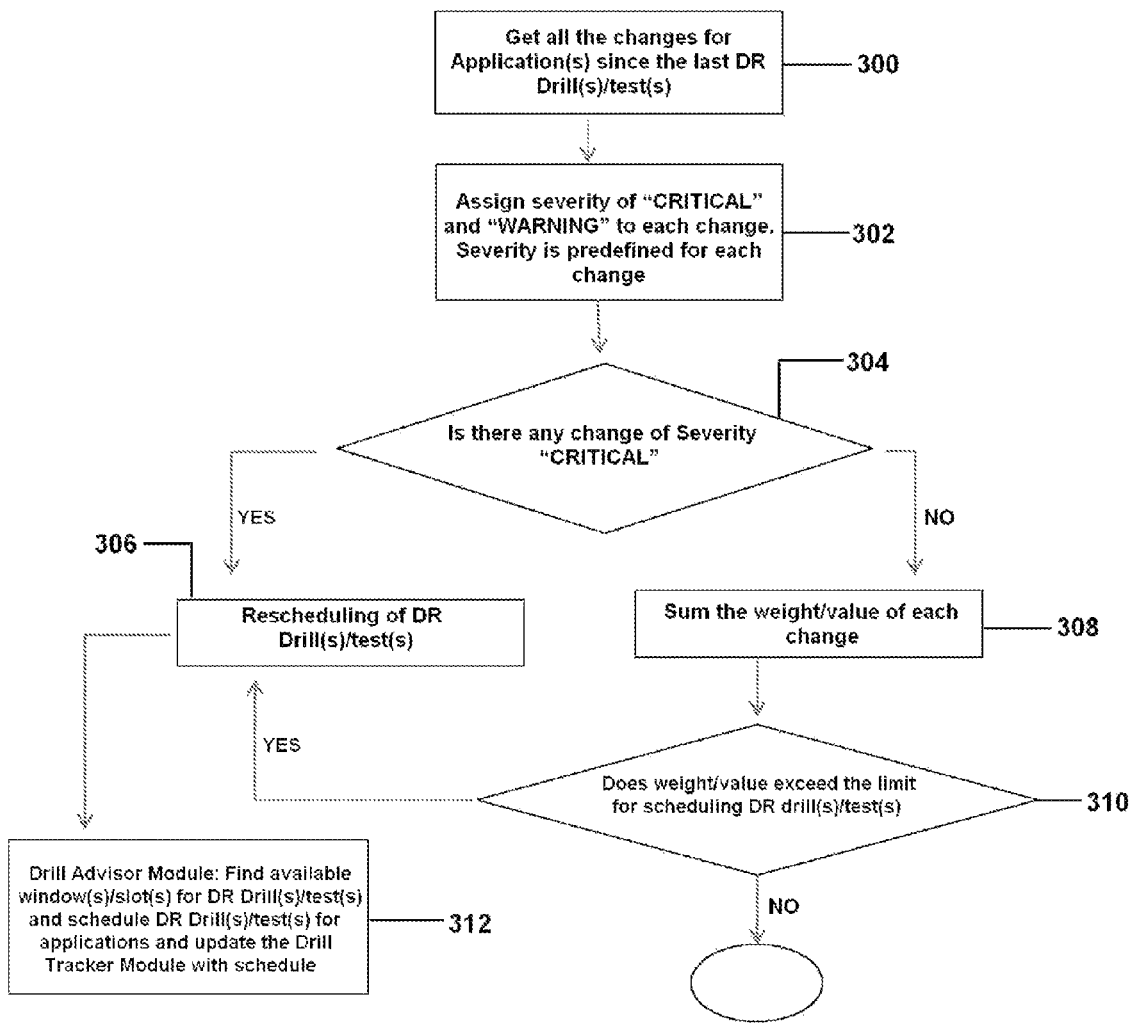
FIG. 4 is a flow chart further illustrating the steps involved in proactively scheduling Disaster Recovery (DR) drills/test(s) according to the present invention.
Figure 5:
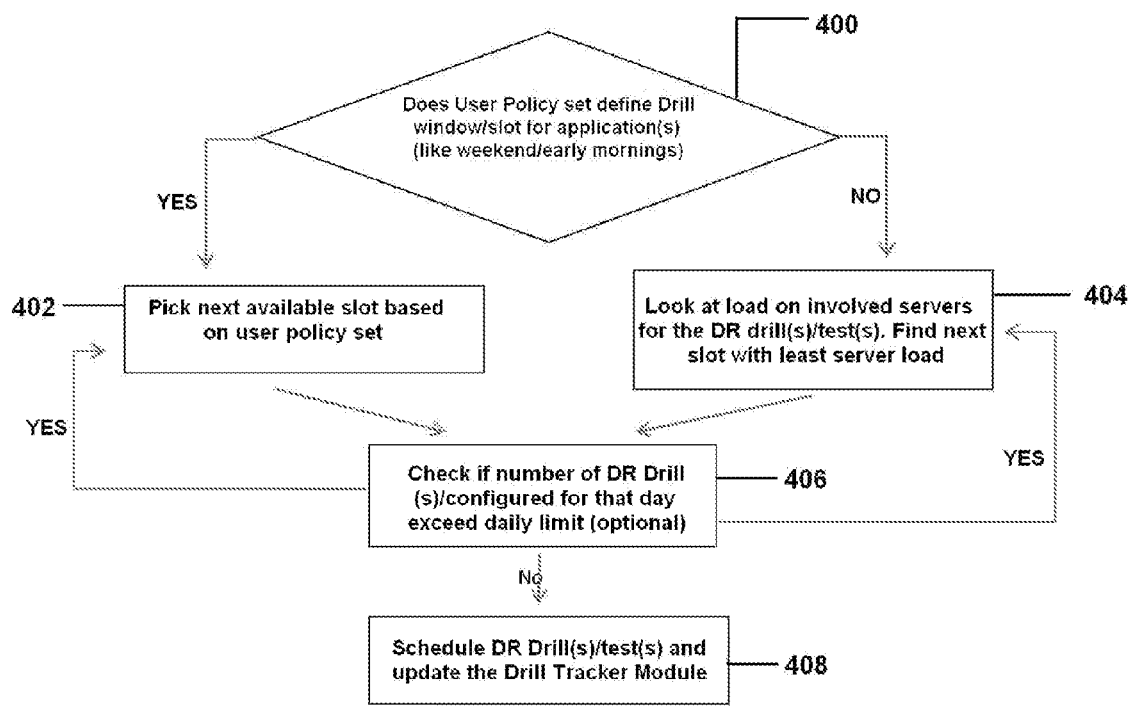
FIG. 5 is a flow chart further illustrating the steps involved in proactively scheduling Disaster Recovery (DR) drills/test(s) according to the present invention.

Reference will now be made to FIG. 4 which is a flowchart further describing the step 400. At step 400, the Drill Advisor Module 26 is prompted to check, if the user policy set defines a drill window/slot for re-scheduling the DR drill/test. If the user policy at step 400 defines a window/slot for re-scheduling the DR drill/test, the system 10 goes to step 402. At step 402, the Drill Advisor Module 26 is prompted to pick the next available window/slot based on the user policy set. However, if the user policy at step 400 does not define a window/slot for re-scheduling the DR drill/test, the Drill Advisor Module 26 is prompted to go to step 404. At step 404, the Drill Advisor Module 26 is prompted to check the load on servers involved in the system 10 to find the next window/slot with the least server load. The information on the loads on servers is fetched by the Drill Advisor Module 26 from Application Load Monitoring Schedule 22.

Depending on the output of steps 402 and 404, the Drill Advisor Module 26, at step 406, may be prompted to check if the number of DR drills/tests configured for a particular day exceeds the daily limit of the number of DR drills/tests to be conducted.

If the number of DR drill(s)/test(s) configured for a particular day at step 406 exceeds the daily limit of the number of drill(s) to be conducted, the Drill Advisor Module 26 may be prompted to revert to steps 402 or 404. Thereafter, the DR drill(s)/test(s) may be re-scheduled for a DR drill on the next available window/slot where the number of DR drills/tests configured for a particular day does not exceed the daily limit of the number of drills to be conducted.

However, if the number of DR drills/tests configured for a particular day at step 406 does not exceed the daily limit of the number of drill(s) to be conducted, the DR drill/test at step 408 may be scheduled on the available widow/slot.

In various embodiments of the present invention, the system and method herein can operate in varied environment and on heterogeneous platforms such as heterogeneous servers and operating systems environments.

While the present invention has been shown and described with reference to exemplary embodiments, it will be understood by those skilled in the art that various changes in form and detail may be made therein without departing from or offending the spirit and scope of the invention as defined by the appended claims.

Although this invention has been disclosed in the context of certain preferred embodiments and examples, it will be understood by those skilled in the art that the present invention can be constructed and utilized in a plethora of different ways. It should be understood that many changes, modifications, variations and other uses and applications will become apparent to those persons skilled in this particular area of technology and to others after having been exposed to the present specification and accompanying drawings. Any and all such change, modifications, variations, and other uses and applications which do not depart from the spirit and scope of the present invention are therefore covered by and embraced within the present invention and the patent claims set forth herein-below.

LIST OF REFERENCE NUMERALS

10 System
12 Drill Intelligence Module
14 Production Site
16 Disaster Recovery Site
18 Network
20 Configuration Monitoring Module
22 Application Load Monitoring Module
24 Drill Tracker Module
26 Drill Advisor Module
28 Replication System
30 First computer
32 Second computer
34 Storage Units

What is claimed is:

1. A method for using a configuration monitoring system for scheduling a disaster recovery drill/test for a production site comprising a plurality of production computer equipment equipped with applications that are regularly updated for replicating with a recovery site comprising a plurality of recovery computer equipment configured to replicate the functionality of the production site, said configuration monitoring system comprising a computer system configured for executing software applications for automatically performing the steps of:
   storing in the computer system a list of applications used at said production site;
   storing in the computer system user policies related to user preferences for drill/test scheduling;
   storing in the computer system a list of scheduled drills/tests for replicating said production site with said recovery site;
   determining the next scheduled drill/test from said list of scheduled drills/tests;
   determining, based on evaluating the user policies and the list of applications, whether the next scheduled drill/test satisfies the user policies and if not scheduling a new drill/test, wherein if the next scheduled drill/test satisfies the user policies, performing the steps of:
      obtaining, from the production site over a communication network, a list of changes implemented at the production site that have occurred since a preceding drill/test,
      assigning a severity level to each change on the list of changes, wherein said severity level ranges up to a critical level, and
      if any of the changes on the list of changes is assigned to the critical level scheduling a new drill/test, otherwise determining whether the compilation of severity levels exceeds a predetermined value, in which case performing the step of scheduling a new drill/test;
   and if no new drill/test has been scheduled, continue to follow the list of scheduled drills/tests without any new drill/test being scheduled.

2. The method as claimed in claim 1, further comprising a step of accumulating changes since the immediately preceding drill/test to determine if the next scheduled drill/test satisfies said user policy.

3. The method as claimed in claim 1, further comprising a step of checking the user policy defining a drill window/slot for re-scheduling the drill/test if the next scheduled drill/test does not satisfy the user policy set.

4. The method as claimed in claim 1, wherein a severity level of "CRITICAL" and "WARNING" is determined on the basis of a weight/value of each change in the list of changes.

5. The method as claimed in claim 1, wherein the predetermined value to re-schedule the drill(s)/test(s) is stored in a Drill Advisor Module.

6. The method as claimed in claim 1, further comprising the steps of:
   checking the user policy defining a drill window/slot for re-scheduling the drill/test if the next scheduled drill/test does not satisfy the user policy set;
   picking the next window/slot for re-scheduling the drill/test available in the user policy set;
   checking and finding the next window/slot with the least server load in the system if the user policy does not define a window/slot for re-scheduling drill(s)/test(s);
   updating the list of scheduled drills/tests with any updates to the schedule of drill(s)/test(s) obtained by this method.

7. The method as claimed in claim 6, further comprising the step of checking a daily limit of the number of drill(s)/test(s) to be conducted on a particular day.

8. The method as claimed in claim 7, further comprising the step of picking a next available window/slot defined in said user policy when the number of drill(s)/test(s) to be conducted on a particular day exceeds the daily limit.

9. The method as claimed in claim 8, further comprising the step of updating the list of scheduled drills/tests and update a Drill Tracker Module with the new schedule of drill(s)/test(s).

10. The method as claimed in claim 7, further comprising the step of picking a next window/slot with the least server load in the system when the number of drill(s)/test(s) to be conducted on a particular day exceeds the daily limit.

11. A method for using a configuration monitoring system for scheduling a disaster recovery drill/test for a production site comprising a plurality of production computer equipment equipped with applications that are regularly updated for replicating with a recovery site comprising a plurality of recovery computer equipment configured to replicate the functionality of the production site, said configuration monitoring system comprising a computer system configured for executing software applications for automatically performing the steps of:
   storing in the computer system a list of applications used at said production site;
   storing in the computer system user policies related to user preferences for drill/test scheduling;
   storing in the computer system a list of scheduled drills/tests for replicating said production site with said recovery site;

determining the next scheduled drill/test from said list of scheduled drills/tests;

determining, based on evaluating the user policies and the list of applications, whether the next scheduled drill/test satisfies the user policies and if not scheduling a new drill/test, wherein if the next scheduled drill/test satisfies the user policies, performing the steps of:

obtaining, from the production site over a communication network, a list of changes implemented at the production site that have occurred since a preceding drill/test, assigning a severity level to each change on the list of changes, wherein said severity level ranges up to a critical level, and if any of the changes on the list of changes is assigned to the critical level scheduling a new drill/test, otherwise determining whether the compilation of severity levels exceeds a predetermined value, in which case performing the step of scheduling a new drill/test;

if the user policy defines slots for drill/tests, selecting the next available slot for the drills/tests otherwise select a slot with the least server load;

determining if system resources are overloaded by a scheduled drill/test, and if so, rescheduling that drill/test; and updating the list of scheduled drills/tests to include any new and/or rescheduled drill(s)/test(s).

\* \* \* \* \*